United States Patent
Kim et al.

(10) Patent No.: US 10,021,709 B2
(45) Date of Patent: Jul. 10, 2018

(54) METHOD FOR DETERMINING PRIORITIES OF SERVICES AND WIRELESS EQUIPMENT THEREOF

(71) Applicant: LG ELECTRONICS INC., Seoul (KR)

(72) Inventors: Sangwon Kim, Seoul (KR); Youngdae Lee, Seoul (KR); Sunghoon Jung, Seoul (KR)

(73) Assignee: LG ELECTRONICS INC., Seoul (KR)

(*) Notice: Subject to any disclaimer, the term of this patent is extended or adjusted under 35 U.S.C. 154(b) by 94 days.

(21) Appl. No.: 15/022,172

(22) PCT Filed: Oct. 30, 2014

(86) PCT No.: PCT/KR2014/010274
§ 371 (c)(1),
(2) Date: Mar. 15, 2016

(87) PCT Pub. No.: WO2015/068983
PCT Pub. Date: May 14, 2015

(65) Prior Publication Data
US 2016/0227553 A1  Aug. 4, 2016

Related U.S. Application Data

(60) Provisional application No. 61/899,885, filed on Nov. 5, 2013.

(51) Int. Cl.
*H04W 72/10* (2009.01)
*H04W 76/40* (2018.01)
(Continued)

(52) U.S. Cl.
CPC ............ *H04W 72/10* (2013.01); *H04W 4/06* (2013.01); *H04W 72/005* (2013.01);
(Continued)

(58) Field of Classification Search
CPC .......... H04W 4/06; H04W 4/08; H04W 4/10; H04W 36/36; H04W 72/005;
(Continued)

(56) References Cited

U.S. PATENT DOCUMENTS

| 2005/0090278 A1 | 4/2005 | Jeong et al. |
| 2005/0192021 A1 | 9/2005 | Lee et al. |

(Continued)

FOREIGN PATENT DOCUMENTS

| KR | 1020130050196 | 5/2013 |
| WO | 2013023864 | 2/2013 |
| WO | 2013051871 | 4/2013 |

OTHER PUBLICATIONS

PCT International Application No. PCT/KR2014/010274, Written Opinion of the International Searching Authority dated Feb. 11, 2015, 1 page.

*Primary Examiner* — Yemane Mesfin
*Assistant Examiner* — Peter Chen
(74) *Attorney, Agent, or Firm* — Lee, Hong, Degerman, Kang & Waimey

(57) ABSTRACT

There is provided a method for determining priorities of services. The method may be performed by a user equipment (UE) and comprise: determining, by the UE, whether to prioritize a group communication (GC) service over a non-GC service, wherein the GC service is received through a multimedia broadcast multicast service (MBMS) bearer or through a unicast bearer; and transmitting, from the UE and to a network, an uplink message including an indicator for indicating that the GC service is prioritized over the non-GS service.

12 Claims, 10 Drawing Sheets

(51) Int. Cl.
*H04W 4/06* (2009.01)
*H04W 72/00* (2009.01)
*H04W 72/12* (2009.01)
*H04W 72/04* (2009.01)
*H04W 76/00* (2018.01)

(52) U.S. Cl.
CPC ... *H04W 72/0413* (2013.01); *H04W 72/1242* (2013.01); *H04W 76/002* (2013.01); *H04W 76/40* (2018.02)

(58) Field of Classification Search
CPC ............ H04W 72/0413; H04W 72/10; H04W 72/121; H04W 72/00; H04W 72/042; H04W 72/0446; H04W 72/0466; H04W 72/0453; H04W 72/1242; H04W 72/1247; H04W 72/048; H04W 76/002; H04L 12/18; H04L 12/185; H04L 47/24; H04L 65/4076
See application file for complete search history.

(56) References Cited

U.S. PATENT DOCUMENTS

| | | | |
|---|---|---|---|
| 2014/0064176 A1* | 3/2014 | Anchan | H04W 4/06 370/312 |
| 2014/0198645 A1* | 7/2014 | Worrall | H04W 4/06 370/230 |
| 2016/0021516 A1* | 1/2016 | Han | H04W 4/06 370/312 |
| 2016/0227385 A1* | 8/2016 | Ahmad | H04L 65/4061 |
| 2016/0269189 A1* | 9/2016 | Xu | H04W 4/06 |

\* cited by examiner

MBMS GW: MBMS Gateway
MCE: Multi-Cell /Multicast Coordination Entity

M1: user plane inter face
M2: E-UTRAN internal control plane interface
M3: control plane interface between E-UTRAN and EPC

US 10,021,709 B2

METHOD FOR DETERMINING PRIORITIES OF SERVICES AND WIRELESS EQUIPMENT THEREOF

CROSS-REFERENCE TO RELATED APPLICATIONS

This application is the National Stage filing under 35 U.S.C. 371 of International Application No. PCT/KR2014/010274, filed on Oct. 30, 2014, which claims the benefit of U.S. Provisional Application No. 61/899,885, filed on Nov. 5, 2013, the contents of which are all hereby incorporated by reference herein in their entirety.

FIELD OF THE INVENTION

The present invention relates to wireless communication, and more specifically, to a method for determining priorities of services and a wireless equipment thereof.

RELATED ART

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

The 3GPP LTE can provide a multimedia broadcast multicast service (MBMS) service. The MBMS is a service which simultaneously transmits data packets to multiple users. If a specific level of users exist in the same cell, the respective users can be allowed to share necessary resources so that the plurality of users can receive the same multimedia data, thereby increasing resource efficiency. In addition, a multimedia service can be used with a low cost from the perspective of users.

Recently, the group communication service has been researched. The group communication service is intended to provide a fast and efficient mechanism to distribute the same content to multiple users in a controlled manner. The group communication service may be delivered via a bearer of the MBMS or a unicast bearer.

However, there is no way to prioritize the group communication service over a general MBMS or a general unicast service.

SUMMARY OF THE INVENTION

Therefore, an object of the present invention is to solve the above-explained problem.

To achieve these and other advantages and in accordance with the purpose of the present invention, as embodied and broadly described herein, there is provided a method for determining priorities of services. The method may be performed by a user equipment (UE) and comprise: determining, by the UE, whether to prioritize a group communication (GC) service over a non-GC service, wherein the GC service is received through a multimedia broadcast multicast service (MBMS) bearer or through a unicast bearer; and transmitting, from the UE and to a network, an uplink message including an indicator for indicating that the GC service is prioritized over the non-GS service.

The method may further comprise: determining, by the UE, whether to prioritize the non-GC service through the MBMS bearer over the non-GC service through the unicast bearer. The uplink message may further includes a MBMS interest indication message including a MBMS priority indicating whether to prioritize the MBMS bearer over the unicast bearer. The UE and the network may consider that the MBMS priority included in the MBMS interest indication message is related to the non-GC service.

The indicator may further indicate that the GC service through the MBMS bearer is prioritized over the non-GC service through the MBMS bearer.

The indicator may further indicate that the GC service through the MBMS bearer is prioritized over the non-GC service through the unicast bearer.

Also, to achieve these and other advantages and in accordance with the purpose of the present invention, as embodied and broadly described herein, there is provided a wireless equipment for determining priorities of services. The wireless equipment may comprise: a processor configured to determine whether to prioritize a group communication (GC) service over a non-GC service, wherein the GC service is received through a multimedia broadcast multicast service (MBMS) bearer or through a unicast bearer; and a transceiver controlled by the processor and configured to transmit, to a network, an uplink message including an indicator for indicating that the GC service is prioritized over the non-GS service.

According to the present disclosure, the above-explained problem may be solved.

DESCRIPTION OF EXEMPLARY EMBODIMENTS

Figure 1:
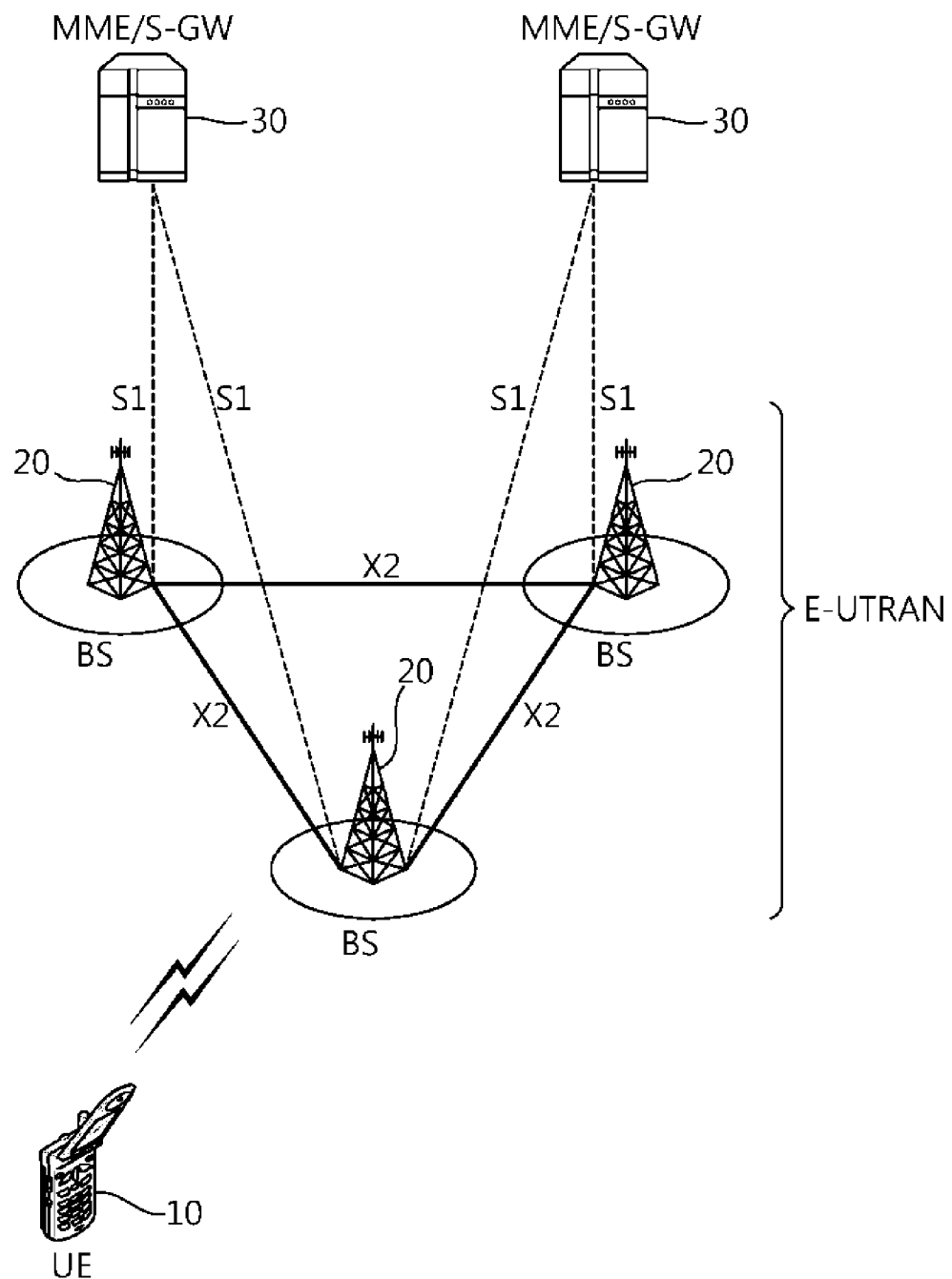
FIG. 1 shows a wireless communication system to which the present invention is applied.

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

Description will now be given in detail of a drain device and a refrigerator having the same according to an embodiment, with reference to the accompanying drawings.

The present invention will be described on the basis of a universal mobile telecommunication system (UMTS) and an evolved packet core (EPC). However, the present invention is not limited to such communication systems, and it may be also applicable to all kinds of communication systems and methods to which the technical spirit of the present invention is applied.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

The terms used herein including an ordinal number such as first, second, etc. can be used to describe various elements, but the elements should not be limited by those terms. The terms are used merely to distinguish an element from the other element. For example, a first element may be named to a second element, and similarly, a second element may be named to a first element.

In case where an element is "connected" or "linked" to the other element, it may be directly connected or linked to the other element, but another element may be existed therebetween. On the contrary, in case where an element is "directly connected" or "directly linked" to another element, it should be understood that any other element is not existed therebetween.

Hereinafter, preferred embodiments of the present invention will be described in detail with reference to the accompanying drawings, and the same or similar elements are designated with the same numeral references regardless of the numerals in the drawings and their redundant description will be omitted. In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings. The spirit of the invention should be construed as being extended even to all changes, equivalents, and substitutes other than the accompanying drawings.

There is an exemplary UE (User Equipment) in accompanying drawings, however the UE may be referred to as terms such as a terminal, a mobile equipment (ME), a mobile station (MS), a user terminal (UT), a subscriber station (SS), a wireless device (WD), a handheld device (HD), an access terminal (AT), and etc. And, the UE may be implemented as a portable device such as a notebook, a mobile phone, a PDA, a smart phone, a multimedia device, etc, or as an unportable device such as a PC or a vehicle-mounted device.

FIG. 1 shows a wireless communication system to which the present invention is applied.

The wireless communication system may also be referred to as an evolved-UMTS terrestrial radio access network (E-UTRAN) or a long term evolution (LTE)/LTE-A system.

The E-UTRAN includes at least one eNodeB (eNB), i.e., base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNodeB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

Figure 2:
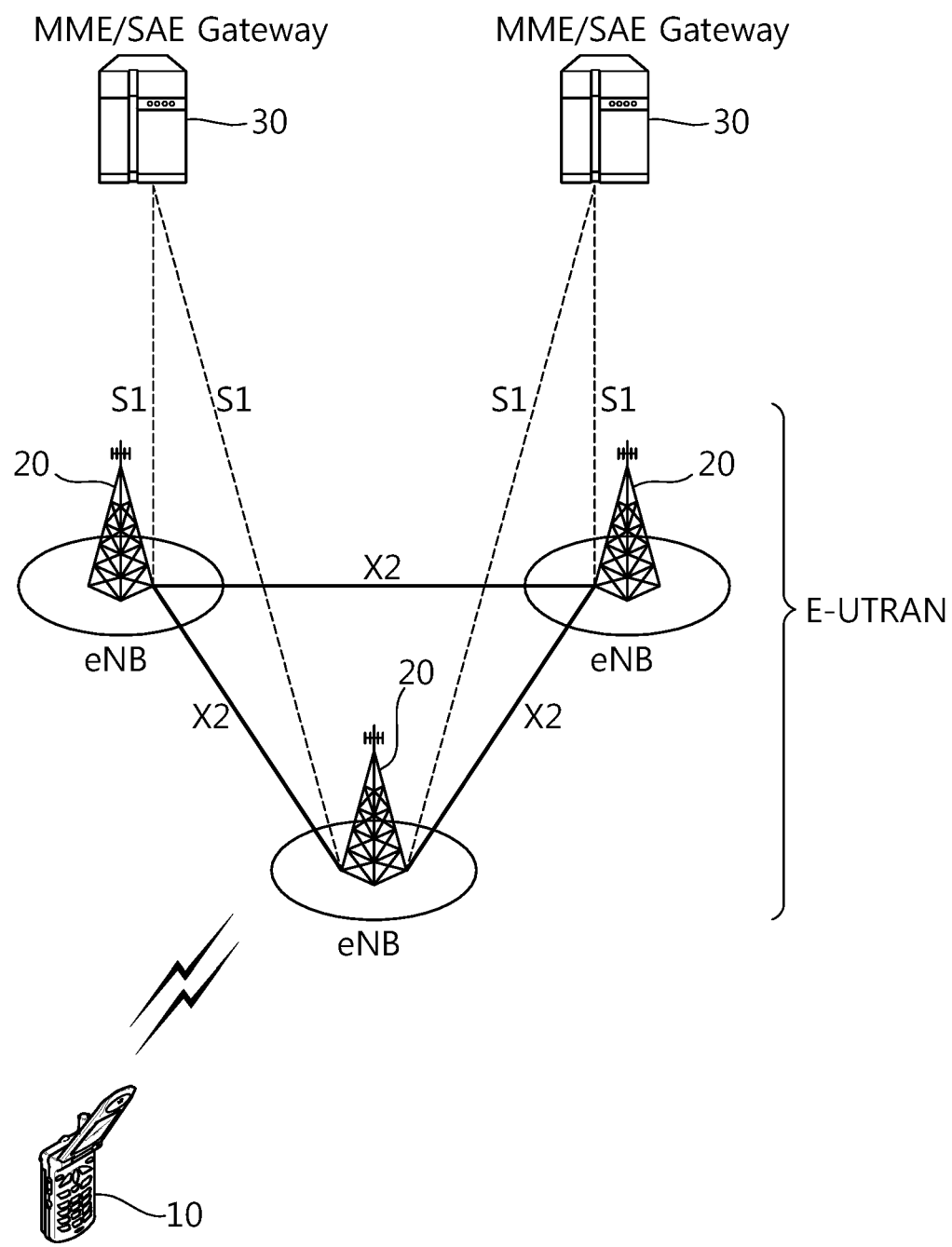
FIG. 2 shows a block diagram of architecture of a typical E-UTRAN and a typical EPC.

FIG. 2 shows a block diagram of architecture of a typical E-UTRAN and a typical EPC.

Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE IDLE state management, ciphering of the user plane, SAE bearer control, and ciphering and integrity protection of NAS signaling.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 3:
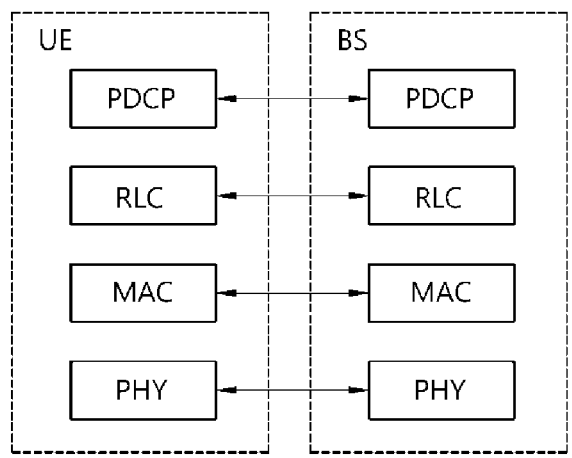
FIG. 3 is a diagram showing a radio protocol architecture for a user plane.
Figure 4:
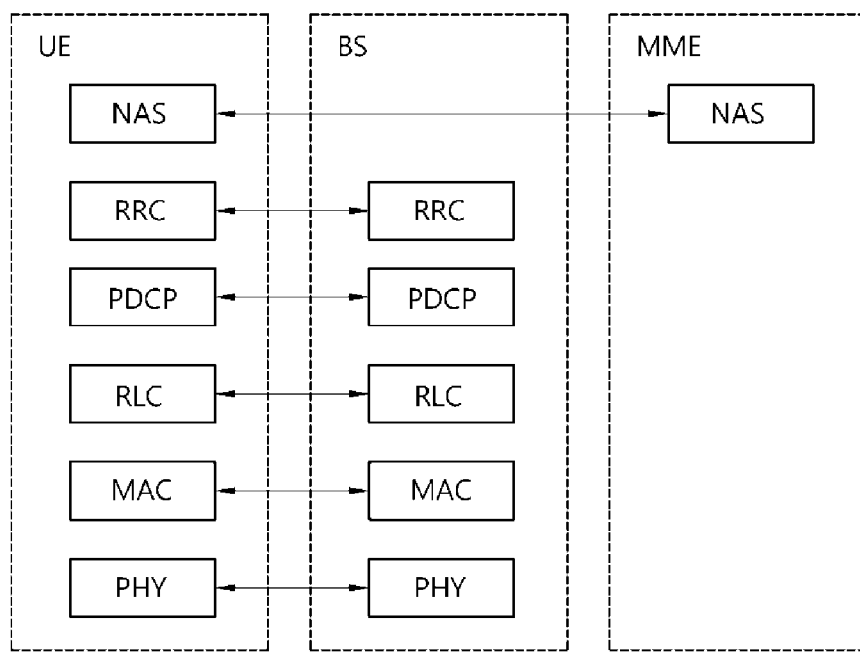
FIG. 4 is a diagram showing a radio protocol architecture for a control plane.

FIG. 3 is a diagram showing a radio protocol architecture for a user plane. FIG. 4 is a diagram showing a radio protocol architecture for a control plane.

The user plane is a protocol stack for user data transmission. The control plane is a protocol stack for control signal transmission.

Referring to FIGS. 3 and 4, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Between different PHY layers, i.e., a PHY layer of a transmitter and a PHY layer of a receiver, data is transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (also may be referred as an RRC connected mode), and otherwise the UE is in an RRC idle state (also may be referred as an RRC idle mode).

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several subcarriers in a frequency domain. One subframe includes a plurality of OFDM symbols in the time domain. A resource block is a resource allocation unit, and includes a plurality of OFDM symbols and a plurality of subcarriers. Further, each subframe may use particular subcarriers of particular OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Hereinafter, an RRC state of a UE and an RRC connection mechanism will be described.

The RRC state indicates whether an RRC layer of the UE is logically connected to an RRC layer of an E-UTRAN. If the two layers are connected to each other, it is called an RRC connected state, and if the two layers are not connected to each other, it is called an RRC idle state. When in the RRC connected state, the UE has an RRC connection and thus the E-UTRAN can recognize a presence of the UE in a cell unit. Accordingly, the UE can be effectively controlled. On the other hand, when in the RRC idle state, the UE cannot be recognized by the E-UTRAN, and is managed by a core network in a tracking area unit which is a unit of a wider area than a cell. That is, regarding the UE in the RRC idle state, only a presence or absence of the UE is recognized in a wide area unit. To get a typical mobile communication service such as voice or data, a transition to the RRC connected state is necessary.

When a user initially powers on the UE, the UE first searches for a proper cell and thereafter stays in the RRC idle state in the cell. Only when there is a need to establish an RRC connection, the UE staying in the RRC idle state establishes the RRC connection with the E-UTRAN through an RRC connection procedure and then transitions to the RRC connected state. Examples of a case where the UE in the RRC idle state needs to establish the RRC connection are various, such as a case where uplink data transmission is necessary due to telephony attempt of the user or the like or a case where a response message is transmitted in response to a paging message received from the E-UTRAN.

A non-access stratum (NAS) layer belongs to an upper layer of the RRC layer and serves to perform session management, mobility management, or the like.

Now, a radio link failure will be described.

A UE persistently performs measurement to maintain quality of a radio link with a serving cell from which the UE receives a service. The UE determines whether communication is impossible in a current situation due to deterioration of the quality of the radio link with the serving cell. If it is determined that the quality of the serving cell is so poor that communication is almost impossible, the UE determines the current situation as a radio link failure.

If the radio link failure is determined, the UE gives up maintaining communication with the current serving cell, selects a new cell through a cell selection (or cell reselection) procedure, and attempts RRC connection re-establishment to the new cell.

Multimedia Broadcast Multicast Services (MBMS) is described. It may be referred to Section 15 of 3GPP TS 36.300 V11.7.0 (2013-09), and Section 5.8 of 3GPP TS 36.331 V11.1.0 (2012-09).

Figure 5:
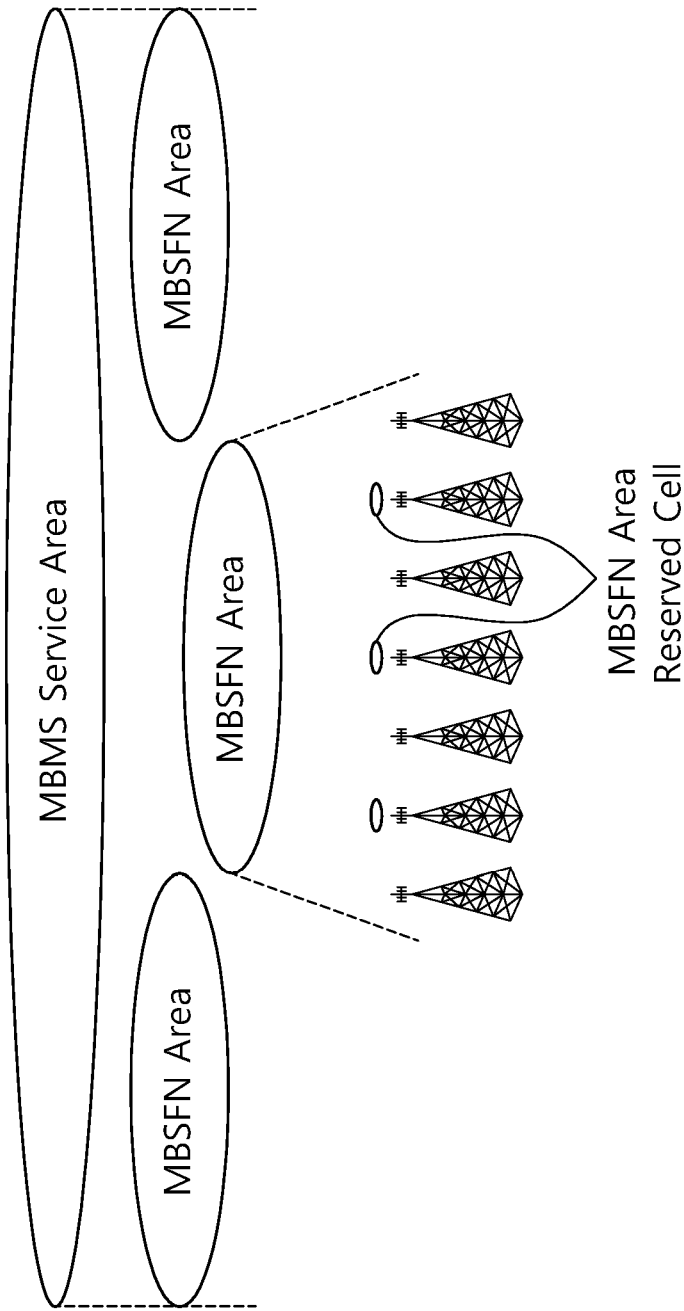
FIG. 5 shows MBMS definitions.

FIG. 5 shows MBMS definitions.

For MBMS, the following definitions may be introduced

MBSFN synchronization area: This is an area of the network where all eNBs can be synchronized and perform MBSFN transmissions. MBSFN synchronization areas are capable of supporting one or more MBSFN areas. On a given frequency layer, an eNB can only belong to one MBSFN synchronization area. MBSFN synchronization areas are independent from the definition of MBMS service areas.

MBSFN transmission or a transmission in MBSFN mode: This is a simulcast transmission technique realized by transmission of identical waveforms at the same time from multiple cells. An MBSFN transmission from multiple cells within the MBSFN area is seen as a single transmission by a UE.

MBSFN area: an MBSFN area consists of a group of cells within an MBSFN synchronization area of a network, which are coordinated to achieve an MBSFN transmission. Except for the MBSFN area reserved cells, all cells within an MBSFN area contribute to the MBSFN transmission and advertise its availability. The UE may only need to consider a subset of the MBSFN areas that are configured, i.e., when it knows which MBSFN area applies for the service(s) it is interested to receive.

MBSFN area reserved cell: This is a cell within a MBSFN area which does not contribute to the MBSFN transmission. The cell may be allowed to transmit for other services but at restricted power on the resource allocated for the MBSFN transmission.

Synchronization sequence: Each synchronization protocol data unit (SYNC PDU) contains a time stamp which indicates the start time of the synchronization sequence. For an MBMS service, each synchronization sequence has the same duration which is configured in the broadcast and multicast service center (BM-SC) and the multi-cell/multicast coordination entity (MCE).

Synchronization period: The synchronization period provides the time reference for the indication of the start time of each synchronization sequence. The time stamp which is provided in each SYNC PDU is a relative value which refers to the start time of the synchronization period. The duration of the synchronization period is configurable.

In E-UTRAN, MBMS can be provided with single frequency network mode of operation (MBSFN) only on a frequency layer shared with non-MBMS services (set of cells supporting both unicast and MBMS transmissions, i.e., set of "MBMS/Unicast-mixed cells").

MBMS reception is possible for UEs in RRC_CONNECTED or RRC_IDLE states. Whenever receiving MBMS services, a user shall be notified of an incoming call, and originating calls shall be possible. Robust header compression (ROHC) is not supported for MBMS.

Figure 6:
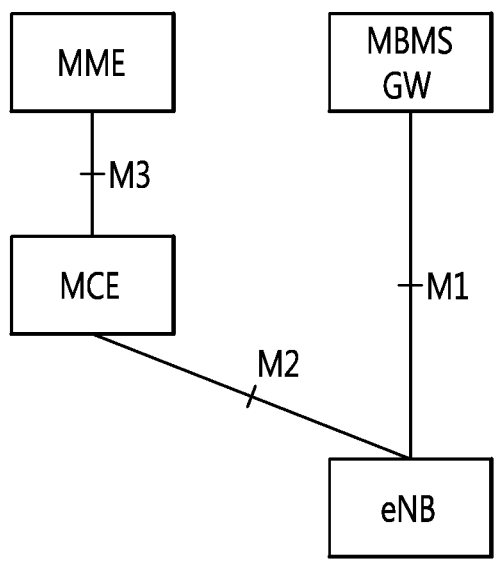
FIG. 6 shows an enhanced MBSM (E-MBMS) logical architecture.

FIG. 6 shows an enhanced MBSM (E-MBMS) logical architecture.

3GPP LTE may support the MBMS, and 3GPP LTE-A may support the E-MBMS.

Referring to FIG. 6, the MCE is connected with the eNB via M2 interface, and with the MME via M3 interface. The MCE is a logical entity. The MCE may be a part of another network element. The functions of the MCE are as follows.

the admission control and the allocation of the radio resources used by all eNBs in the MBSFN area for multi-cell MBMS transmissions using MBSFN operation. The MCE decides not to establish the radio bearer(s) of the new MBMS service(s) if the radio resources are not sufficient for the corresponding MBMS service(s) or may pre-empt radio resources from other radio bearer(s) of ongoing MBMS service(s) according to allocation and retention priority (ARP). Besides allocation of the time/frequency radio resources this also includes deciding the further details of the radio configuration, e.g., the modulation and coding scheme.

counting and acquisition of counting results for MBMS service(s).

resumption of MBMS session(s) within MBSFN area(s) based on, e.g., the ARP and/or the counting results for the corresponding MBMS service(s).

suspension of MBMS session(s) within MBSFN area(s) based on, e.g., the ARP and/or on the counting results for the corresponding MBMS service(s).

The MCE is involved in MBMS session control signaling. The MCE does not perform UE-MCE signaling. An eNB is served by a single MCE.

The MBMS GW is a logical entity. The MBMS GW may be a part of another network element. The MBMS G is present between the BMSC and eNBs whose principal functions is the sending/broadcasting of MBMS packets to each eNB transmitting the service. The MBMS GW uses IP multicast as the means of forwarding MBMS user data to the eNB. The MBMS GW performs MBMS session control signaling (session start/update/stop) towards the E-UTRAN via the MME.

The M3 interface is a control plane interface which connects between the MCE and MME. An application part is defined for this interface between the MME and MCE. This application part allows for MBMS session control signaling on E-UTRAN radio access bearer (E-RAB) level (i.e., does not convey radio configuration data). The procedures comprise, e.g., MBMS session start and stop. Stream control transmission protocol (SCTP) is used as signaling transport i.e., point-to-point signaling is applied.

The M2 interface is a control plane interface which connects between the MCE and eNB. An application part is defined for this interface, which conveys at least radio configuration data for the multi-cell transmission mode eNBs and session control signaling. SCTP is used as signaling transport, i.e., point-to-point signaling is applied.

The M1 interface is a pure user plane interface which connects the MBMS GW and eNB. Consequently no control plane application part is defined for this interface. IP multicast is used for point-to-multipoint delivery of user packets.

In general, the control information relevant only for UEs supporting MBMS is separated as much as possible from unicast control information. Most of the MBMS control information is provided on a logical channel specific for MBMS common control information, i.e., the MCCH. E-UTRA employs one MCCH logical channel per MBSFN area. In case the network configures multiple MBSFN areas, the UE acquires the MBMS control information from the MCCHs that are configured to identify if services it is interested to receive are ongoing. It may be assumed that an MBMS capable UE is only required to support reception of a single MBMS service at a time. The MCCH carries the MBSFNAreaConfiguration message, which indicates the MBMS sessions that are ongoing as well as the (corresponding) radio resource configuration. The MCCH may also carry the MBMSCountingRequest message, when E-UTRAN wishes to count the number of UEs in RRC_CONNECTED that are receiving or interested to receive one or more specific MBMS services.

A limited amount of MBMS control information is provided on the BCCH. This primarily concerns the information needed to acquire the MCCH(s). This information is carried by means of a single MBMS specific system information block, i.e., SystemInformationBlockType13. An MBSFN area is identified solely by the mbsfn-AreaId in SystemInformationBlockType13. At mobility, the UE considers that the MBSFN area is continuous when the source cell and the target cell broadcast the same value in the mbsfn-AreaId.

The MCCH information is transmitted periodically, using a configurable repetition period. Scheduling information is not provided for MCCH, i.e., both the time domain scheduling as well as the lower layer configuration are semi-statically configured, as defined within SystemInformationBlockType13.

For MBMS user data, which is carried by the MTCH logical channel, E-UTRAN periodically provides MCH scheduling information (MSI) at lower layers (MAC). This MCH information only concerns the time domain scheduling, i.e., the frequency domain scheduling and the lower layer configuration are semi-statically configured. The periodicity of the MSI is configurable and defined by the MCH scheduling period.

Figure 7:
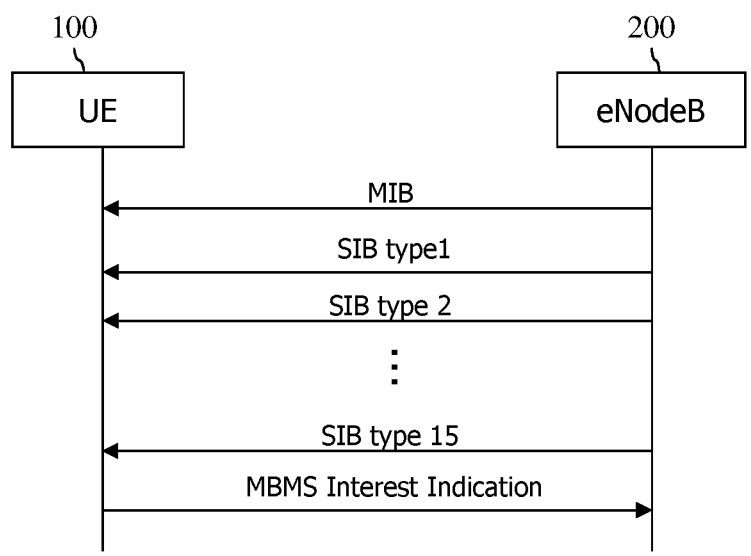
FIG. 7 shows exemplary signal flows for delivering system information relating to MBMS.

FIG. 7 shows exemplary signal flows for delivering system information relating to MBMS.

Referring to FIG. 7, an eNodeB (i.e., base station) broadcasts system information. The system information is divided into a master information block (MIB) and a plurality of system information blocks (SIBs):

The MIB defines the most essential physical layer information of the cell required to receive further system information. The plurality of SIBs may be classified as follows:

SIBtype1 contains information relevant when evaluating if a UE is allowed to access a cell and defines the scheduling of other system information blocks;

SIBtype2 contains common and shared channel information;

SIBtype3 contains cell re-selection information, mainly related to the serving cell;

SIBtype4 contains information about the serving frequency and intra-frequency neighbouring cells relevant for cell re-selection (including cell re-selection parameters common for a frequency as well as cell specific re-selection parameters);

SIBtype5 contains information about other E-UTRA frequencies and inter-frequency neighbouring cells relevant for cell re-selection (including cell re-selection parameters common for a frequency as well as cell specific re-selection parameters);

SIBtype6 contains information about UTRA frequencies and UTRA neighbouring cells relevant for cell re-selection (including cell re-selection parameters common for a frequency as well as cell specific re-selection parameters);

SIBtype7 contains information about GERAN frequencies relevant for cell re-selection (including cell re-selection parameters for each frequency);

SIBtype8 contains information about CDMA2000 frequencies and CDMA2000 neighbouring cells relevant for cell re-selection (including cell re-selection parameters common for a frequency as well as cell specific re-selection parameters);

SIBtype9 contains a home eNB name (HNB name);

SIBtype10 contains an ETWS primary notification;

SIBtype11 contains an ETWS secondary notification;

SIBtype12 contains a CMAS warning notification;

SIBtype13 contains MBMS-related information;

SIBtype14 contains information about Extended Access Barring for access control;

SIBtype15 contains information related to mobility procedures for MBMS reception.

Again, referring to FIG. 7, the UE 100 may transmit a MBMS interest indication.

The MBMS interest indication is transmitted to inform E-UTRAN that the UE is receiving or is interested to receive MBMS via an MRB, and if so, to inform E-UTRAN about the priority of MBMS versus unicast reception.

An MBMS capable UE in RRC_CONNECTED may initiate the transmission of the MBMS interest indication in several cases including upon successful connection establishment, upon entering or leaving the service area, upon session start or stop, upon change of interest, upon change of priority between MBMS reception and unicast reception or upon change to a PCell broadcasting SystemInformationBlockType15.

Upon initiating the transmission of the MBMS interest indication, the UE shall:

1> if SystemInformationBlockType15 is broadcast by the PCell:

2> ensure having a valid version of SystemInformationBlockType15 for the PCell;

2> if the UE did not transmit an MBMSInterestIndication message since last entering RRC_CONNECTED state; or 2> if since the last time the UE transmitted an MBMSInterestIndication message, the UE connected to a PCell not broadcasting SystemInformationBlockType15:

3> if the set of MBMS frequencies of interest, determined as follows, is not empty:

4> initiate transmission of the MBMSInterestIndication message;

2> else:

3> if the set of MBMS frequencies of interest, determined as follows, has changed since the last transmission of the MBMSInterestIndication message; or 3> if the prioritization of reception of all indicated MBMS frequencies compared to reception of any of the established unicast bearers has changed since the last transmission of the MBMSInterestIndication message:

4> initiate transmission of the MBMSInterestIndication message;

Here, the UE may send an MBMSInterestIndication even when it is able to receive the MBMS services it is interested in i.e. to avoid that the network allocates a configuration inhibiting MBMS reception.

Now, the determination of MBMS frequencies of interest is explained.

The UE shall:

1> consider a frequency to be part of the MBMS frequencies of interest if the following conditions are met:

2> at least one MBMS session the UE is receiving or interested to receive via an MRB is ongoing or about to start; and Here, the UE may determine whether the session is ongoing from the start and stop time indicated in the User Service Description (USD).

2> for at least one of these MBMS sessions SystemInformationBlockType15 acquired from the PCell includes for the concerned frequency one or more MBMS SAIs as indicated in the USD for this session; and Here, the UE may consider a frequency to be part of the MBMS frequencies of interest even though E-UTRAN may (temporarily) not employ an MRB for the concerned session. I.e. the UE does not verify if the session is indicated on MCCH.

2> the UE is capable of simultaneously receiving the set of MBMS frequencies of interest, regardless of whether a serving cell is configured on each of these frequencies or not; and 2> the supportedBandCombination the UE included in UE-EUTRA-Capability contains at least one band combination including the set of MBMS frequencies of interest;

Here, Indicating a frequency implies that the UE supports SystemInformationBlockType13 acquisition for the concerned frequency i.e. the indication should be independent of whether a serving cell is configured on that frequency.

And, when evaluating which frequencies it can receive simultaneously, the UE does not take into account the serving frequencies that are currently configured i.e. it only considers MBMS frequencies it is interested to receive.

Also, within this section, the term frequency does not indicate a physical frequency but covers the associated band(s), noting that additional bands may be indicated in SystemInformationBlockType1 (serving frequency) or SystemInformationBlockType15 (neighbouring frequencies).

Now, actions related to transmission of MBMSInterestIndication message is described.

The UE shall set the contents of the MBMSInterestIndication message as follows:

1> if the set of MBMS frequencies of interest is not empty:

2> include mbms-FreqList and set it to include the MBMS frequencies of interest, using the EARFCN corresponding with freqBandIndicator included in SystemInformationBlockType1, if applicable, and the EARFCN(s) as included in SystemInformationBlockType15;

Here, the mbms-FreqList merely indicates the physical frequencies the UE is interested to receive and does not imply the UE supports the associated band.

2> include mbms-Priority if the UE prioritises reception of all indicated MBMS frequencies above reception of any of the unicast bearers;

Here, if the UE prioritises MBMS reception and unicast data cannot be supported because of congestion on the MBMS carrier(s), E-UTRAN may initiate release of unicast bearers. It is up to E-UTRAN implementation whether all bearers or only GBR bearers are released. E-UTRAN does not initiate re-establishment of the released unicast bearers upon alleviation of the congestion.

Meanwhile, the MBMS Interest Indication message may include the following:

TABLE 1

| MBMS Interest Indication field descriptions | |
|---|---|
| mbms-FreqList | List of MBMS frequencies on which the UE is receiving or interested to receive MBMS via an MRB. |

TABLE 1-continued

| MBMS Interest Indication field descriptions | |
|---|---|
| mbms-Priority | Indicates whether the UE prioritises MBMS reception above unicast reception. The field is present (i.e. value true), if the UE prioritises reception of all listed MBMS frequencies above reception of any of the unicast bearers. Otherwise the field is absent. |

Now, a group communication service is described. It may be referred to 3GPP TR 23.768 V0.3.0 (2013-07).

The group communication Service is intended to provide a fast and efficient mechanism to distribute the same content to multiple users in a controlled manner. As an example, the concept of group communications is used extensively in the operation of classical Land Mobile Radio (LMR) systems used for, but not limited to, Public Safety organizations. At the moment, the primary use of a Group Communication Service in LMR is to provide "Push to Talk" (PTT) functionality, so a Group Communication Service based on 3GPP architecture, using LTE radio technology, should enable PTT voice communications with comparable performance.

The service should allow flexible modes of operation as the users and the environment they are operating in evolves. For example, the capabilities of LTE allow for broadband communication, so Group Communication Service is expected to support, voice, video or, more general, data communication. Also LTE can allow users to communicate to several groups at the same time in parallel e.g. voice to one group, different streams of video or data to several other groups.

The users of the group communication service are organized into groups; a user can be member of more than one group.

Figure 8:
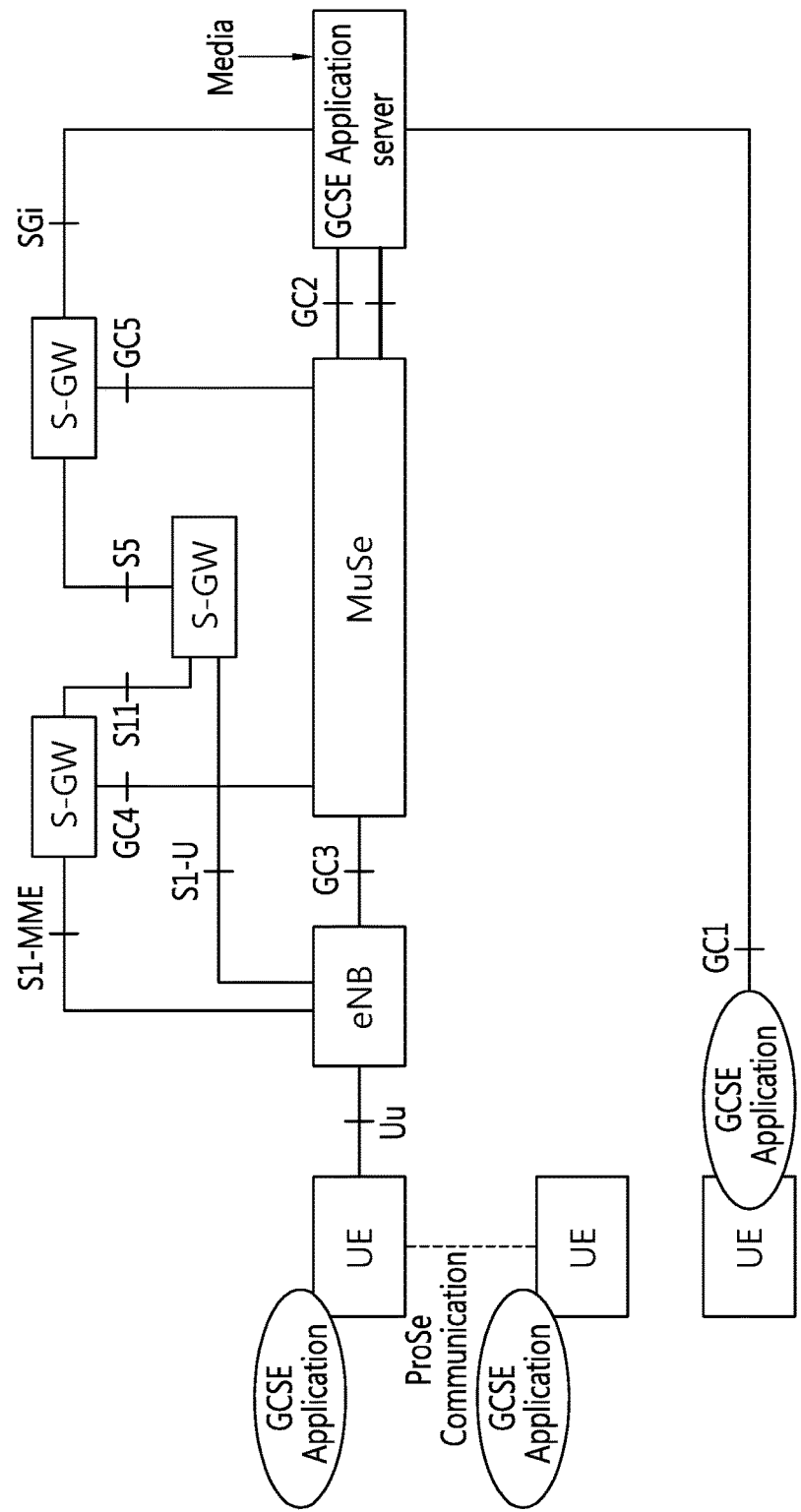
FIG. 8 shows overall of high level architecture view for GCSE_LTE.

FIG. 8 shows overall of high level architecture view for GCSE_LTE.

A few terms may be defined for supporting group communication service enabler (GCSE) or GCSE over LTE (GSCE_LTE). GCSE group is a set of members that are entitled to participate in a group communication service. Multipoint service is a service, which is offered to the GCSE application server (AS) and used to distribute the same group communication data to the UEs of a GCSE Group in a resource efficient way. Multicast delivery is a delivery mode where the group communication data is delivered via shared network resources to multiple group members. Unicast delivery is a delivery mode where the group communication data is delivered to a particular group member via resources dedicated to a group member.

Referring to FIG. 8, the high-level architecture described in FIG. 8 consists of application layer and 3GPP evolved packet system (EPS) layer. The application layer consists of GCSE AS. The 3GPP EPS layer consists of a MuSe function. The MuSe function interworks with the 3GPP EPS entities to provide the multipoint service functionality.

There are a few reference points in the high level architecture for GCSE_LTE.

GC1: It is the reference point between the GCSE application in the UE and in the GSCE AS. It is used to define application level signaling requirement to enable multipoint functionality for GCSE_LTE, and possibly for session establishment and floor control usages, etc.

GC2: It is the reference point between the GCSE AS and the MuSe function. It is used to define the interaction between GCSE AS and MuSe functionality provided by the 3GPP EPS layer.

GC3: It is the reference point between the E-UTRAN and MuSe function. It is used to define the interaction between E-UTRAN and MuSe function in order to achieve multipoint functionality provided by the 3GPP EPS layer.

GC4: It is the reference point between the MME and MuSe function. It is used to define the interaction between MME and MuSe function in order to achieve multipoint functionality provided by the 3GPP EPS layer.

GC5: It is the reference point between the P-GW and MuSe function. It is used to provide DL unicast service by MuSe.

The architecture described above shall allow as an option for the GCSE AS to determine whether to deliver the group call data using unicast delivery or multicast delivery (such as MBMS or E-MBMS) or both.

As such, the group communication service can be provided by both dedicated bearer and MBMS bearer. In general, the group communication user wishes to prioritize reception of group communication above reception of any of the unicast services or MBMS services.

However, by using the above-explained MBMS interest indication, the user prioritize only the MBMS reception over unicast reception, but the user interested in group communication cannot prioritize the group communication service through MBMS over the group communication service through unicast.

Therefore, the present disclosure provides solutions. For example, one exemplary method allows the UE to inform the network about whether the UE prioritizes a group communication (GC) service over a non-GC service. Details about the one example solution are explained below.

Figure 9:
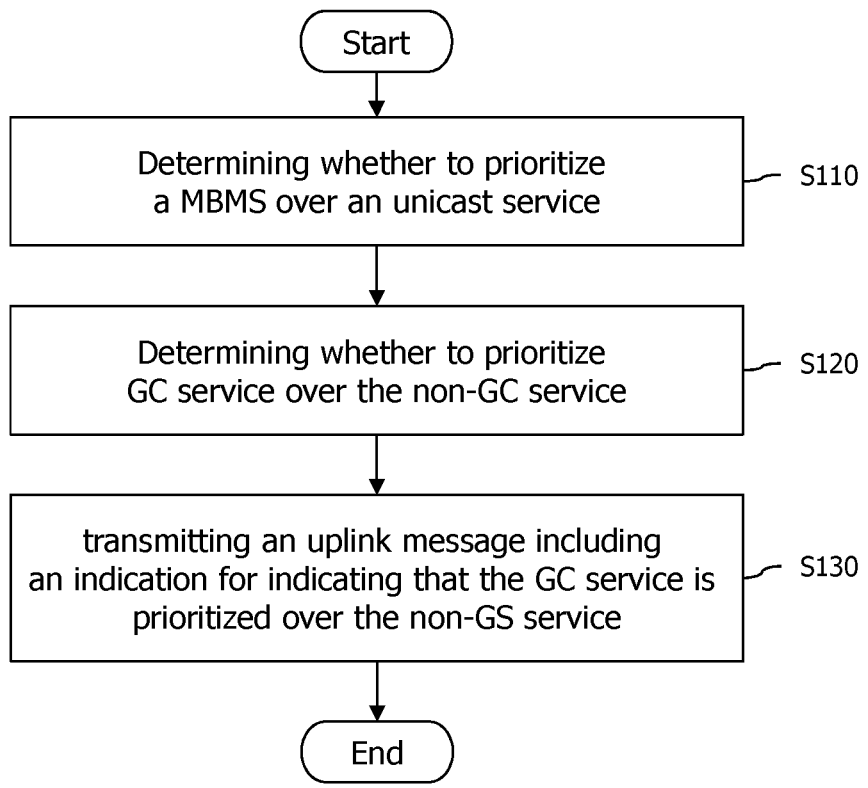
FIG. 9 shows one exemplary method according to the present disclosure.

FIG. 9 shows one exemplary method according to the present disclosure.

Referring to FIG. 9, the UE may determine whether to prioritize a MBMS bearer over a unicast bearer (at step S101). For example, the UE may determine that a priority of the MBMS bearer is higher than a priority of the unicast bearer. Here, this determination is performed with respect to only a non-GC service. In other words, the UE may determine a MBMS Priority indicating a priority of non-GC MBMS services over non-GC unicast services. Here, GC MBMS means the GC service provided through MBMS bearer. Non-GC MBMS means the normal MBMS service (non-group communication) provided in MBMS bearer. GC unicast means the group communication service provided in unicast bearer. Non-GC unicast means the normal unicast service (non-group communication) provided in unicast bearer. The MBMS priority is included in the MBMS interest indication message. Here, both the UE and the network may consider the MBMS Priority in the MBMS Interest Indication message as the priority of non-GC MBMS services over non-GC unicast services.

The UE may determine whether to prioritize GC service over the non-GC service (at step S102). Alternatively, the UE and the network may consider that GC services always have a higher priority than non-GC services.

Then, the UE transmits, to a network, an uplink message (for example, MBMS Interest Indication message transmitted via DCCH) including the MBMS Priority.

The uplink message (for example, MBMS Interest Indication message) may further include an indicator for indicating that the GC service is prioritized over the non-GS service Here, the indicator may further indicates a priority of GC MBMS over non-GC unicast.

And, the indicator may further indicates a priority of GC MBMS over GC unicast.

And, the indicator may further indicates a priority of non-GC MBMS over non-GC unicast.

And, the indicator may further indicates a priority of non-GC MBMS over GC unicast.

And, the indicator may further indicates a priority of GC MBMS over non-GC MBMS.

The indicator may be called as GC priority indicator. Hereinafter, details or variations about the GC priority indicator will be explained.

The UE transmits the existing MBMS priority in order to inform the network about a priority of non-GC MBMS services over non-GC unicast services.

In addition, UE sends the GC priority indication which indicates to the network whether the user prioritizes GC service. If the UE informs network that the user prioritizes GC service by using the GC priority indication, the network will regard that the priority of the GC service is higher than non-GC MBMS and non-GC unicast. Desirably, the GC priority indication is sent via the MBMS Interest Indication message.

When the interested GC service is provided in MBMS bearer, the network operates as follows:
  If the UE informs network that the user prioritizes GC service and the priority of MBMS is higher than the priority of unicast, the network regards that the priority of GC MBMS is the highest, non-GC MBMS has second priority, and the priority of unicast priority is the lowest.
  If the UE informs network that the user prioritizes GC service and the priority of unicast is higher than MBMS, the network regards that the priority of GC MBMS is the highest, unicast has second priority, and the priority of non-GC MBMS priority is the lowest.
  If the UE informs network that the user de-prioritizes GC service and the priority of MBMS is higher than unicast, the network regards that the priority of non-GC MBMS is the highest, unicast has second priority, and the priority of non-GC MBMS priority is the lowest.
  If UE informs network that the user de-prioritizes GC service and the priority of unicast is higher than MBMS, the network regards that the priority of unicast is the highest, non-GC MBMS has second priority, and the priority of GC MBMS priority is the lowest.

Meanwhile, when the interested GC service is provided in unicast bearer, the network operates as follows:
  If the UE informs network that the user prioritizes GC service and the priority of MBMS is higher than unicast, the network regards that the priority of GC unicast is the highest, MBMS has second priority, and the priority of non-GC unicast priority is the lowest.
  If the UE informs network that the user prioritizes GC service and the priority of unicast is higher than MBMS, the network regards that the priority of GC unicast is the highest, non-GC unicast has second priority, and the priority of MBMS priority is the lowest.
  If the UE informs network that the user de-prioritizes GC service and the priority of MBMS is higher than unicast, the network regards that the priority of MBMS is the highest, non-GC unicast has second priority, and the priority of GC unicast priority is the lowest.
  If the UE informs network that the user de-prioritizes GC service and the priority of unicast is higher than MBMS, the network regards that the priority of non- GC unicast is the highest, MBMS has second priority, and the priority of GC unicast priority is the lowest.

Alternatively, the GC priority indication can be called as a GC interest indication. In this case, UE sends the GC interest indication which indicates whether the user is interest in GC service to network. If the UE informs the network that the user is interested in GC service, the network regards that the UE prioritizes GC service over non-GC MBMS and non-GC unicast reception. It is because the priority of GC priority indication is normally higher than that of MBMS priority indication.

Hereinafter, variations on the above-explained exemplary method will be explained.

Firstly, a first variation is to use four-level priorities. According to the first variation, the UE informs network of priority of non-GC MBMS, GC MBMS, non-GC unicast and GC unicast. For example, the UE inform network that the priority of non-GC MBMS, GC MBMS, non-GC unicast and GC unicast are 3rd, 1st, 4th and 2nd, respectively. The four-level priority information is transmitted via MBMS interest indication message.

Secondly, a second variation is to reuse of MBMS priority indicator. Operations of the UE according to the second are as follows:

When the interested GC service is provided in MBMS bearer, the UE operates as follows:
  If the user decided that GC MBMS priority is higher than unicast, and non-GC MBMS priority is also higher than unicast, the UE informs the network that MBMS priority is higher than unicast priority.
  If the user decided that GC MBMS priority is higher than unicast, and non-GC MBMS priority is lower than unicast, the UE informs the network that MBMS priority is higher than unicast priority.
  If the user decided that GC MBMS priority is lower than unicast, and non-GC MBMS priority is higher than unicast, the UE informs the network that unicast priority is higher than MBMS priority.
  If the user decided that GC MBMS priority is lower than unicast, and non-GC MBMS priority is also lower than unicast, the UE informs the network that unicast priority is higher than MBMS priority.

When the interested GC service is provided in unicast bearer, the UE operates as follows:
  If the user decided that GC unicast priority is higher than MBMS, and non-GC unicast priority is also higher than MBMS, the UE informs the network that unicast priority is higher than MBMS priority.
  If the user decided that GC unicast priority is higher than MBMS, and non-GC unicast priority is lower than MBMS, the UE informs the network that unicast priority is higher than MBMS priority.
  If the user decided that GC unicast priority is lower than MBMS, and non-GC unicast priority is higher than MBMS, the UE informs the network that MBMS priority is higher than unicast priority.
  If the user decided that GC unicast priority is lower than MBMS, and non-GC unicast priority is also lower than MBMS, the UE informs the network that MBMS priority is higher than unicast priority.

In the second variation, the UE is able to know whether interested GC service is provided in MBMS bearer or not.

The ways or methods to solve the problem of the related art according to the present disclosure, as described so far, can be implemented by hardware or software, or any combination thereof.

Figure 10:
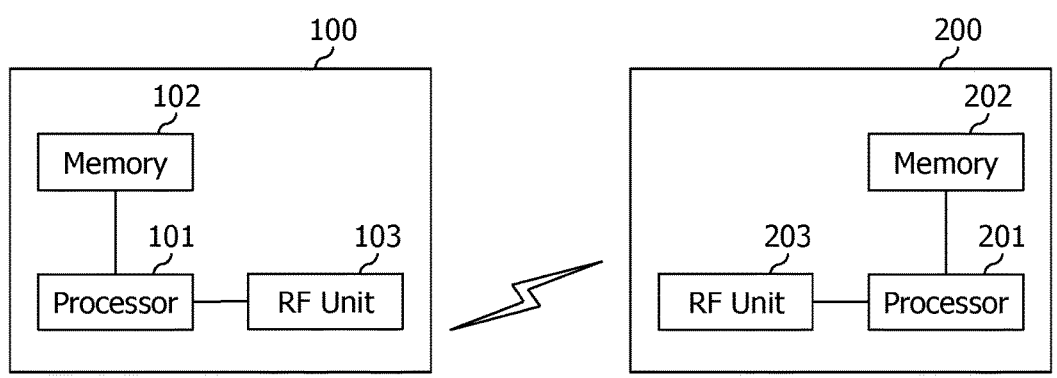
FIG. 10 is a block diagram showing a wireless communication system to implement an embodiment of the present invention.

FIG. 10 is a block diagram showing a wireless communication system to implement an embodiment of the present invention.

An UE 100 includes a processor 101, memory 102, and a radio frequency (RF) unit 103. The memory 102 is connected to the processor 101 and configured to store various information used for the operations for the processor 101. The RF unit 103 is connected to the processor 101 and configured to send and/or receive a radio signal. The processor 101 implements the proposed functions, processed, and/or methods. In the described embodiments, the operation of the UE may be implemented by the processor 101.

The eNodeB 200 includes a processor 201, memory 202, and an RF unit 203. The memory 202 is connected to the processor 201 and configured to store various information used for the operations for the processor 201. The RF unit 203 is connected to the processor 201 and configured to send and/or receive a radio signal. The processor 201 implements the proposed functions, processed, and/or methods. In the described embodiments, the operation of the eNodeB may be implemented by the processor 201.

The processor may include Application-Specific Integrated Circuits (ASICs), other chipsets, logic circuits, and/or data processors. The memory may include Read-Only Memory (ROM), random access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A Method for determining priorities of services, the method performed by a user equipment (UE) and comprising:
    determining whether to prioritize a group communication (GC) service over a non-GC service; and
    transmitting an uplink message including an indicator to a network, the indicator indicating whether the GC service is determined to be prioritized over the non-GC service,
    wherein the GC service is received through either a multimedia broadcast multicast service (MBMS) bearer or a unicast bearer,
    wherein the non-GC service is received through either the MBMS bearer or the unicast bearer, and
    wherein the GC service is determined to be prioritized over the non-GC service even if the GC service is received through the unicast bearer and the non-GC service is received through the MBMS bearer.

2. The method of claim 1, further comprising determining whether to prioritize the non-GC service received through the MBMS bearer over the non-GC service received through the unicast bearer.

3. The method of claim 2, wherein the uplink message further includes an MBMS interest indication message including MBMS priority indicating whether to prioritize the MBMS bearer over the unicast bearer.

4. The method of claim 3, further comprising considering that the MBMS priority included in the MBMS interest indication message is related to the non-GC service.

5. The method of claim 1, wherein the indicator further indicates that the GC service received through the MBMS bearer is prioritized over the non-GC service received through the MBMS bearer.

6. The method of claim 1, wherein the indicator further indicates that the GC service received through the MBMS bearer is prioritized over the non-GC service received through the unicast bearer.

7. A User equipment (UE) for determining priorities of services, the UE comprising:
a transceiver configured to transmit and receive signals; and
a processor configured to:
determine whether to prioritize a group communication (GC) service over a non-GC service; and
control the transceiver to transmit an uplink message including an indicator to a network, the indicator indicating whether the GC service is determined to be prioritized over the non-GC service,
wherein the GC service is received through either a multimedia broadcast multicast service (MBMS) bearer or a unicast bearer,
wherein the non-GC service is received through either the MBMS bearer or the unicast bearer, and
wherein the GC service is determined to be prioritized over the non-GC service even if the GC service is received through the unicast bearer and the non-GC service is received through the MBMS bearer.

8. The UE of claim 7, wherein the processor is further configured to determine whether to prioritize the non-GC service received through the MBMS bearer over the non-GC service received through the unicast bearer.

9. The UE of claim 8, wherein the uplink message further includes an MBMS interest indication message including MBMS priority indicating whether to prioritize the MBMS bearer over the unicast bearer.

10. The UE of claim 9, wherein the processor is further configured to consider that the MBMS priority included in the MBMS interest indication message is related to the non-GC service.

11. The UE of claim 7, wherein the indicator further indicates that the GC service received through the MBMS bearer is prioritized over the non-GC service received through the MBMS bearer.

12. The UE of claim 7, wherein the indicator further indicates that the GC service received through the MBMS bearer is prioritized over the non-GC service received through the unicast bearer.

* * * * *